(12) United States Patent
Ookubo et al.

(10) Patent No.: US 8,040,374 B2
(45) Date of Patent: Oct. 18, 2011

(54) HEAD SEPARATED CAMERA APPARATUS

(75) Inventors: Masatoshi Ookubo, Iruma (JP); Hiroshi Shinozaki, Ome (JP); Kei Tashiro, Ome (JP); Takashi Tsuda, Ome (JP); Hiroyuki Irikura, Ome (JP); Junya Fukumoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 12/769,429

(22) Filed: Apr. 28, 2010

(65) Prior Publication Data

US 2011/0050877 A1    Mar. 3, 2011

(30) Foreign Application Priority Data

Aug. 31, 2009  (JP) .................................. 2009-200853

(51) Int. Cl.
    *H04N 9/47*    (2006.01)
    *H04N 5/22*    (2006.01)
    *H04N 7/18*    (2006.01)
    *H04N 5/232*   (2006.01)

(52) U.S. Cl. ...................... 348/82; 348/333; 348/211.14

(58) Field of Classification Search .................... 348/82, 348/222, 207, 552
    See application file for complete search history.

(56) References Cited

U.S. PATENT DOCUMENTS

| | | | |
|---|---|---|---|
| 5,696,553 A * | 12/1997 | D'Alfonso et al. | 348/211.14 |
| 5,943,364 A | 8/1999 | Yoshida | |
| 7,324,903 B2 | 1/2008 | Cho et al. | |
| 7,728,876 B2 * | 6/2010 | Sakurai et al. | 348/211.14 |
| 7,729,255 B2 | 6/2010 | Tanabe | |
| 2005/0078188 A1 | 4/2005 | Cho et al. | |
| 2005/0206740 A1 | 9/2005 | Tanabe | |
| 2011/0143811 A1 * | 6/2011 | Rodriguez | 455/556.1 |

FOREIGN PATENT DOCUMENTS

| | | |
|---|---|---|
| JP | 1-216688 | 8/1989 |
| JP | 08-223246 | 8/1996 |
| JP | 2000-349727 | 12/2000 |
| JP | 2002-271649 | 9/2002 |
| JP | 2005-269482 | 9/2005 |
| JP | 2007-508648 | 4/2007 |

OTHER PUBLICATIONS

Japanese Patent Application No. 2009-200853; Notification of Reasons for Rejection; Mailed Jun. 29, 2010 (English Translation).
Japanese Patent Application No. 2009-200853; Final Notice of Rejection; Mailed Sep. 14, 2010. (English Translation).

* cited by examiner

*Primary Examiner* — David Czekaj
*Assistant Examiner* — Anner Holder
(74) *Attorney, Agent, or Firm* — Blakely, Sokoloff, Taylor, & Zafman LLP (57) ABSTRACT

According to one embodiment, a head-separated device has an imaging unit, a control unit configured to control the imaging unit and a connection unit configured to connect the imaging unit with the control unit, wherein the imaging unit comprises sensor configured to capture an image, and a transmitter configured to transmit a video signal, a sync signal (HD, VD) and a clock signal to restore or to reproduce the image captured by the sensor, and the control unit comprises a determining module configured to determine whether a waveform of the video signal has a level that the video processor is processable, and a setting module configured to set the transmitter to perform enhancement correction to the video signal, if the determining module determines that the waveform of the video signal does not have the level that the video processor is processable.

22 Claims, 8 Drawing Sheets

| | enhancement correction | amplitude correction | gain correction |
|---|---|---|---|
| 1m~5m | OFF | OFF | OFF |
| 6m~10m | ON | OFF | OFF |
| 11m~15m | ON | ON | OFF |
| 16m~20m | ON | ON | ON |

HEAD SEPARATED CAMERA APPARATUS

CROSS-REFERENCE TO RELATED APPLICATIONS

This application is based upon and claims the benefit of priority from Japanese Patent Application No. 2009-200853, filed Aug. 31, 2009, the entire contents of which are incorporated herein by reference.

BACKGROUND

1. Field

One embodiment of the invention relates to a head separated camera apparatus comprising a camera head and a camera control unit which controls the same, which are separated from each other.

2. Description of the Related Art

As well known, a head separated camera apparatus comprises a camera head and a camera control unit (CCU) as separate bodies. The camera head incorporates a solid-state imaging element, such as a CCD (charge coupled device) sensor or a CMOS (complementary metal-oxide semiconductor) sensor. The CCU supplies a driving control signal to the solid-state imaging element of the camera head, and processes a signal output from the solid-state imaging element to a video signal. The camera head and the CCU are connected to each other via a cable comprising a bundle of signal lines.

Generally, the head separated camera has been developed to, for example, inspect a small area where a human cannot enter. Therefore, the camera head is required to be as compact as possible with the fewest possible components. Further, the cable connecting the camera head and the CCU is required to be long.

The longer the cable in the head separated camera apparatus, the more the waveform disturbance and the attenuation of a signal including a video signal transmitted from the camera head to the CCU.

Jpn. Pat. Appln. KOKAI Publication No. 2000-349727 discloses a bidirectional transmitting apparatus comprising a camera head side transmitting device and a CCU side transmitting device, which are connected via a triax cable. In this apparatus, the CCD side transmitting device detects amplitude of a transmission signal transmitted from the camera head side transmitting device, calculates the attenuation of a signal in the triax cable, and determines the length of the triax cable based on the attenuation. Each of the camera head side transmitting device and the CCU side transmitting device include a gain variable amplifier. The gain variable amplifiers set optimum gains according to the cable length.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a head-separated camera device has an imaging unit, a control unit configured to control the imaging unit, and a connection unit configured to connect the imaging unit with the control unit, wherein the imaging unit comprises a sensor configured to capture an image, and a transmitter configured to transmit a video signal, a sync signal (HD, VD) and a clock signal to restore or to reproduce the image captured by the sensor, and the control unit comprises a receiver configured to receive the video signal, the sync signal and the clock signal, a video processor configured to perform an imaging process with the video signal, the sync signal and the clock signal received by the receiver, a timing signal generator configured to output a driving sync signal and a driving clock signal to the sensor, a determining module configured to determine whether a waveform of the video signal has a level that the video processor is processable, and a setting module configured to set the transmitter to perform enhancement correction to the video signal, if the determining module determines that the waveform of the video signal does not have the level that the video processor is processable.

Figure 1:
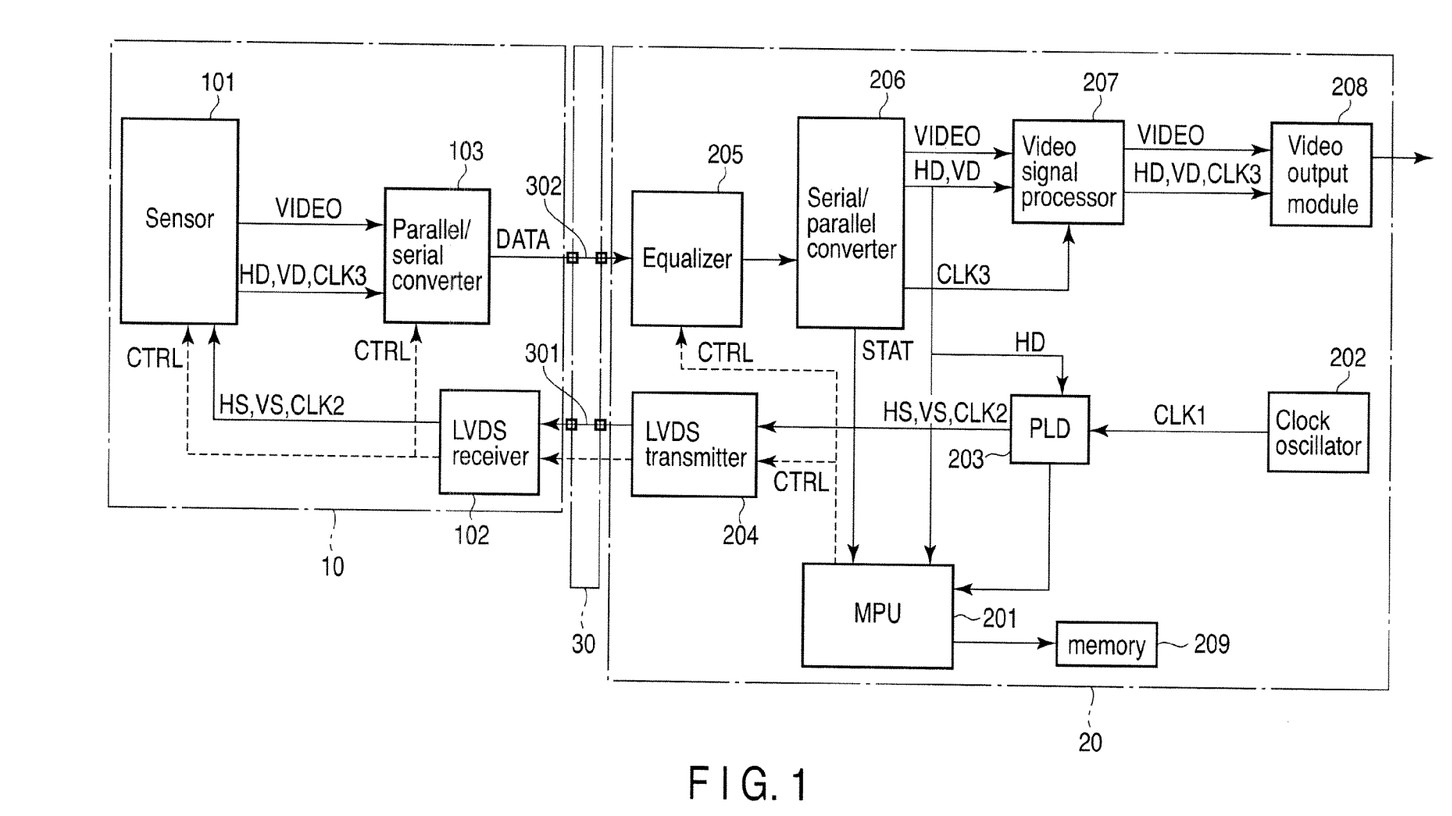
FIG. 1 is an exemplary block configuration diagram for explaining a signal processing system of a head separated camera apparatus according to a first embodiment.

Embodiments will be described below with reference to the accompanying drawings. A first embodiment will be described first. In the first embodiment, the amount of correction to an HD signal returned to a CCU 20 from a camera head 10 is stored in advance as a data table. FIG. 1 shows a signal processing system of a head separated camera apparatus according to the first embodiment. In the head separated camera apparatus of this embodiment, an imaging portion (hereinafter referred to as the camera head) 10 and a control portion (hereinafter referred to as the CCU) 20 which controls the camera head are connected by a camera cable 30.

The camera head 10 comprises a sensor 101, an LVDS (Low Voltage Differential Signaling) receiver 102 and a parallel/serial convertor 103. The CCU 20 comprises an MPU (Micro Processing Unit) 201, a clock oscillator 202, a PLD (Programmable Logic Device) 203, an LVDS transmitter 204, an equalizer 205, a serial/parallel convertor 206, a video signal processor 207, a video output module 208 and a memorymemory 209. The MPU 201 receives operation information supplied externally by the user, and controls the respective portions constituting the camera head 10 and the CCU 20 to reflect the operation information. The broken line in FIG. 1 represents a control signal line (CTRL signal line) for control by the MPU 201.

Operations of the respective portions will now be described along the flow of a signal. First, the clock oscillator 202 oscillates a first clock signal (CLK1) having predetermined pulse characteristics. The clock oscillator 202 supplies CLK1 to the PLD 203.

The PLD 203 generates a drive control timing signal for the sensor 101 based on the signal CLK1. The PLD 203 has a timing signal generating function. The PLD 203 generates a horizontal sync signal (HS), a vertical sync signal (VS) and a second clock signal (CLK2) for driving the sensor.

The LVDS transmitter 204 transmits the signals HS, VS and CLK2 to the LVDS receiver 102 of the camera head 10 through a control signal cable 301 under the control of the MPU 201. Although, in this embodiment, the LVDS transmitter 204 and the LVDS receiver 102 are used to transmit the signals HS, VS and CLK2 at a high speed to the camera head 10, another interface may be used.

Figure 2:
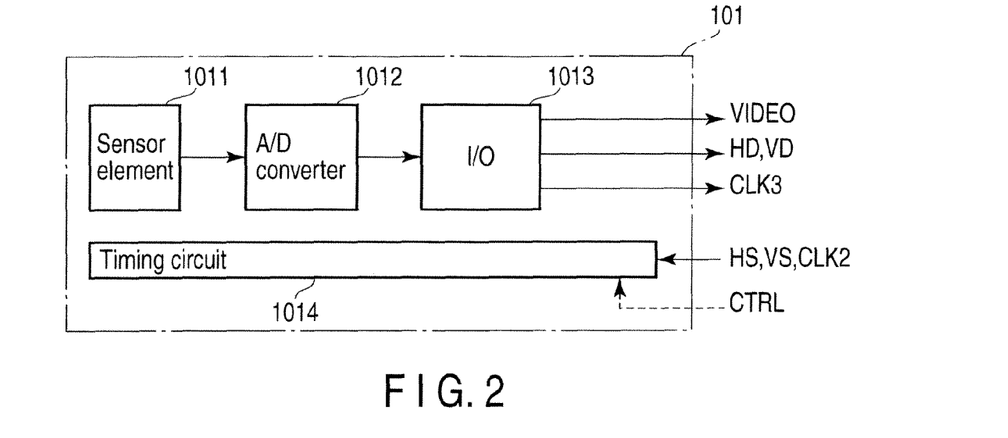
FIG. 2 is an exemplary block diagram illustrating a detailed configuration of a sensor portion according to the first embodiment.

The LVDS receiver 102 supplies the signals HS, VS and CLK2 to the sensor 101 under the control of the MPU 201. The sensor 101 is a digital sensor, such as a CMOS sensor. FIG. 2 is a block diagram illustrating a detailed configuration of the sensor 101. The sensor 101 comprises a sensor element 1011, an A/D (Analog/Digital) converter 1012, an I/O (Input/Output) 1013 and a timing circuit 1014.

The sensor element 1011 is a CCD or CMOS sensor, which images an incident optical image of an object on a light receiving surface. The A/D converter 1012 converts the optical image to a corresponding digital video signal. The I/O 1013 latches a video signal (VIDEO), an image horizontal sync signal (HD) and an image vertical sync signal (VD) to restore the optical image with a third clock signal (CLK 3), and supplies them through different signal lines to the parallel/serial convertor 103. The timing circuit 1014 supplies a clock signal to the sensor element 1011, the A/D converter 1012 and the I/O 1013.

The parallel/serial convertor 103 mixes and superimposes the phase-aligned signals VIDEO, HD, VD and CLK3, and converts them to serial data (high-speed serial signal) under the control of the MPU 201. For example, the parallel/serial convertor 103 embeds the signals VIDEO, HD, VD and CLK3 into the signal CLK3 to transmit them simultaneously. The parallel/serial convertor 103 functions as a transmitter. The parallel/serial convertor 103 transmits the serial data to the equalizer 205 of the CCU 20 via a data signal cable 302. The equalizer 205 as a gain correction module amplifies a gain of serial data under the control of the MPU 201.

The serial/parallel convertor 206 separates the serial data amplified by the equalizer 205 into parallel data of the signals VIDEO, HD, VD and CLK3. The serial/parallel convertor 206 functions as a receiver. The serial/parallel convertor 206 supplies the signals VIDEO, HD, VD and CLK3 to the video signal processor 207. Further, the serial/parallel convertor 206 supplies the signal HD to the PLD 203.

Figure 3:
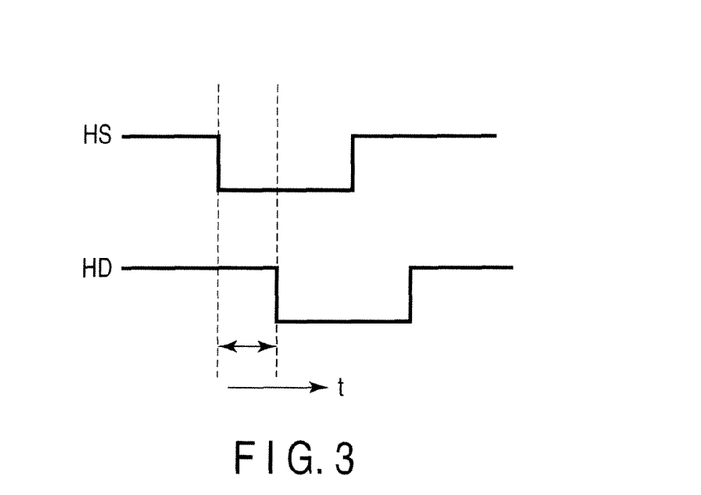
FIG. 3 is an exemplary waveform diagram schematically showing HS and HD timings according to the first embodiment.

FIG. 3 is a diagram showing waveforms of the signal HS generated by the PLD 203 and the signal HD supplied from the serial/parallel convertor 206. The PLD 203 detects a pulse width from the phase difference between the signals HS and HD. The PLD 203 supplies pulse width information to the MPU 201. The PLD 203 may supply counter value information, instead of the pulse width information, to the MPU 201.

The video signal processor 207 performs a predetermined signal process to the signals VIDEO, HD, VD and CLK3. The video signal processor 207 supplies the processed signals VIDEO, HD, VD and CLK3 to the video output module 208. The video output module 208 converts the signals VIDEO, HD, VD and CLK3 to a video signal of a predetermined specification and outputs it to a monitor (not shown).

The memory 209 stores information indicating the relationship between a length of the data signal cable 302 and a pulse width based on the phase difference between the signals HS and HD. The memory 209 also stores information on conditions for correcting serial data in association with the length of the data signal cable 302.

Figure 4:
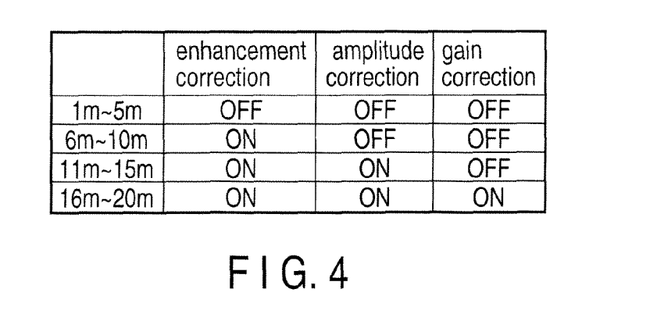
FIG. 4 is an exemplary table showing the relationship between the length of a data signal cable and corrections to serial data according to the first embodiment.

For example, conditions for correction are set as follows. The lengths of the data signal cable 302 as threshold values for the conditions are mere examples and should not be limited to those described below. In the case where the length of the data signal cable 302 is 1 m to 5 m, enhancement correction to serial data sent from the parallel/serial convertor 103 is OFF, amplitude correction is OFF, and gain correction by the equalizer 205 is OFF. In the case where the length of the data signal cable 302 is 6 m to 10 m, enhancement correction to serial data sent from the parallel/serial convertor 103 is ON, amplitude correction is OFF, and gain correction by the equalizer 205 is OFF.

In the case where the length of the data signal cable 302 is 11 m to 15 m, enhancement correction to serial data sent from the parallel/serial convertor 103 is ON, amplitude correction is ON, and gain correction by the equalizer 205 is OFF. In the case where the length of the data signal cable 302 is 16 m to 20 m, enhancement correction to serial data sent from the parallel/serial convertor 103 is ON, amplitude correction is ON, and gain correction by the equalizer 205 is ON.

The MPU 201 detects the length of the data signal cable 302 based on the pulse width information supplied from the PLD 203. The MPU 201 sets correction conditions in accordance with the length of the data signal cable 302 to the parallel/serial convertor 103 and the equalizer 205 based on the information stored in the memory 209, which is shown in FIG. 4. In other words, the MPU 201 determined whether the waveform (eye pattern) of serial data is degraded or narrowed.

Figure 5A:
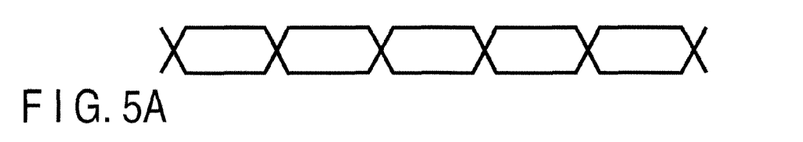
FIG. 5A is an exemplary view showing a schematic waveform of serial data received by the serial/parallel convertor in a case where the data signal cable is short.

FIG. 5A shows a schematic waveform of serial data received by the serial/parallel convertor 206 in a case where the data signal cable 302 is short. The eye pattern is not narrowed. Therefore, the MPU 201 does not perform correction to the serial data in the case where the data signal cable 302 is short (in the case where the eye pattern is not narrowed).

Figures 5B, 5C:
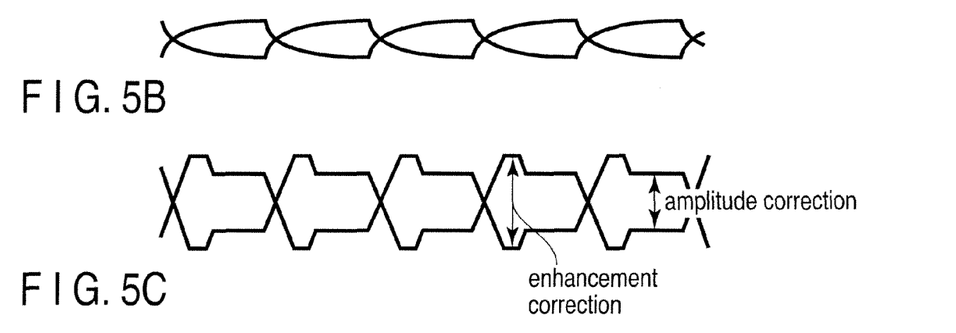
FIG. 5B is an exemplary view showing a schematic waveform of serial data received by the serial/parallel convertor in a case where the data signal cable is relatively long.
FIG. 5C is an exemplary view showing a schematic waveform of enhancement-corrected and amplitude-corrected serial data received by the serial/parallel convertor in a case where the data signal cable is relatively long.

If the data signal cable 302 is relatively long, the amplitude of the serial data is smaller and the rise of the serial data is more gradual, as shown in FIG. 5B. Therefore, as the data signal cable 302 is longer (as the eye pattern is narrower), the MPU 201 adds corrections one by one in the order of enhancement correction, amplitude correction and gain correction by the equalizer 205. The enhancement correction is performed first, because it is the most effective to the gradual rise of the waveform.

FIG. 5C shows a schematic waveform of enhancement-corrected and amplitude-corrected serial data received by the serial/parallel convertor 206 in a case where the data signal cable 302 is relatively long. The video signal processor 207 can accurately process the signal VIDEO obtained from the enhancement-corrected and amplitude-corrected serial data.

According to the first embodiment, to correct the serial data, the MPU 201 first performs enhancement correction. Therefore, the waveform of the serial data received by the serial/parallel convertor 206 has a steep rise.

Further, the MPU 201 corrects the serial data under different correcting conditions corresponding to the lengths of the data signal cable 302. Therefore, the serial/parallel convertor 206 can receive serial data of an optimum amplitude.

In the first embodiment, the enhancement correction by the parallel/serial convertor 103 may be performed in a plurality of stages (for example, at every meter) depending on the length of the data signal cable 302 detected by the MPU 201. The amplitude correction by the parallel/serial convertor 103 or the gain correction by the equalizer 205 may also be performed in a plurality of stages in the same manner.

Figure 6:
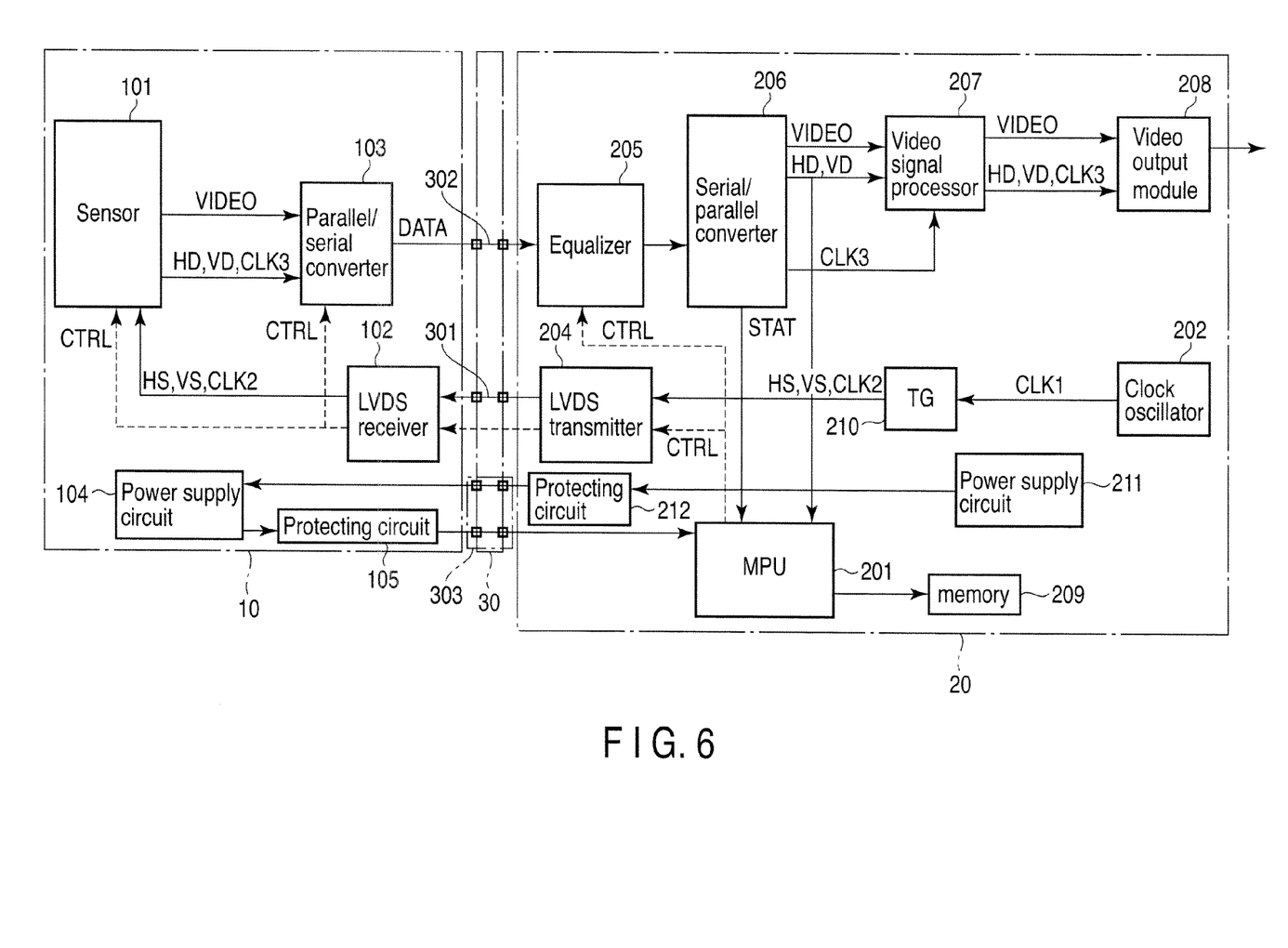
FIG. 6 is an exemplary block configuration diagram for explaining a signal processing system of a head separated camera apparatus according to a second embodiment.

A second embodiment will now be described. In the second embodiment, the amount of correction to a DC voltage is stored in advance as a data table. FIG. 6 shows a signal processing system of a head separated camera according to the second embodiment. The parts of the second embodiment that correspond to those of the first embodiments are identified by the same reference numerals as those in the first embodiment, and explanations thereof will be omitted. The second embodiment includes a TG (Timing Generator) 210 in place of the PLD 203 shown in FIG. 1. The TG 203 is a timing signal generator which generates signals HS, VS and CLK2.

The CCU 20 comprises a power supply circuit 211 and a protecting circuit 212. The camera head 10 comprises a power supply circuit 104 and a protecting circuit 105. The camera cable 30 comprises a power supply cable 303. The power supply cable 303 applies a voltage from the CCU to the camera head 10 and from the camera head 10 to the CCU 20.

The power supply circuit 211 of the CCU 20 applies a direct-current voltage of a constant value to the power supply circuit 104 of the camera head 10 via the protecting circuit 212. The power supply circuit 104 of the camera head 10 applies a direct-current voltage to an A/D port of the MPU 201 via the protecting circuit 105.

The memory 209 prestores the value of a direct-current voltage applied from the CCU 20 to the camera head 10. The memory 209 prestores the relationship between the length of the power supply cable 303 and the amount of a voltage drop of the direct-current voltage by the power supply cable 303. The memory 209 also prestores the information shown in FIG. 4 as well as in the first embodiment.

The MPU 201 detects a voltage drop of the direct-current voltage by the power supply cable 303 from the difference between the value of the direct-current voltage applied from the camera head 10 to the MPU 201 and the value of the direct-current voltage applied from the CCU 20 to the camera head 10. Then, the MPU 201 acquires from memory 209 the length of the power supply cable 303 corresponding to the voltage drop of the direct-current voltage. As well as in the first embodiment, the MPU 201 sets correction conditions in accordance with the length of the data signal cable 302 to the parallel/serial convertor 103 and the equalizer 205 based on the information stored in the memory 209, which is shown in FIG. 4.

Figure 7:
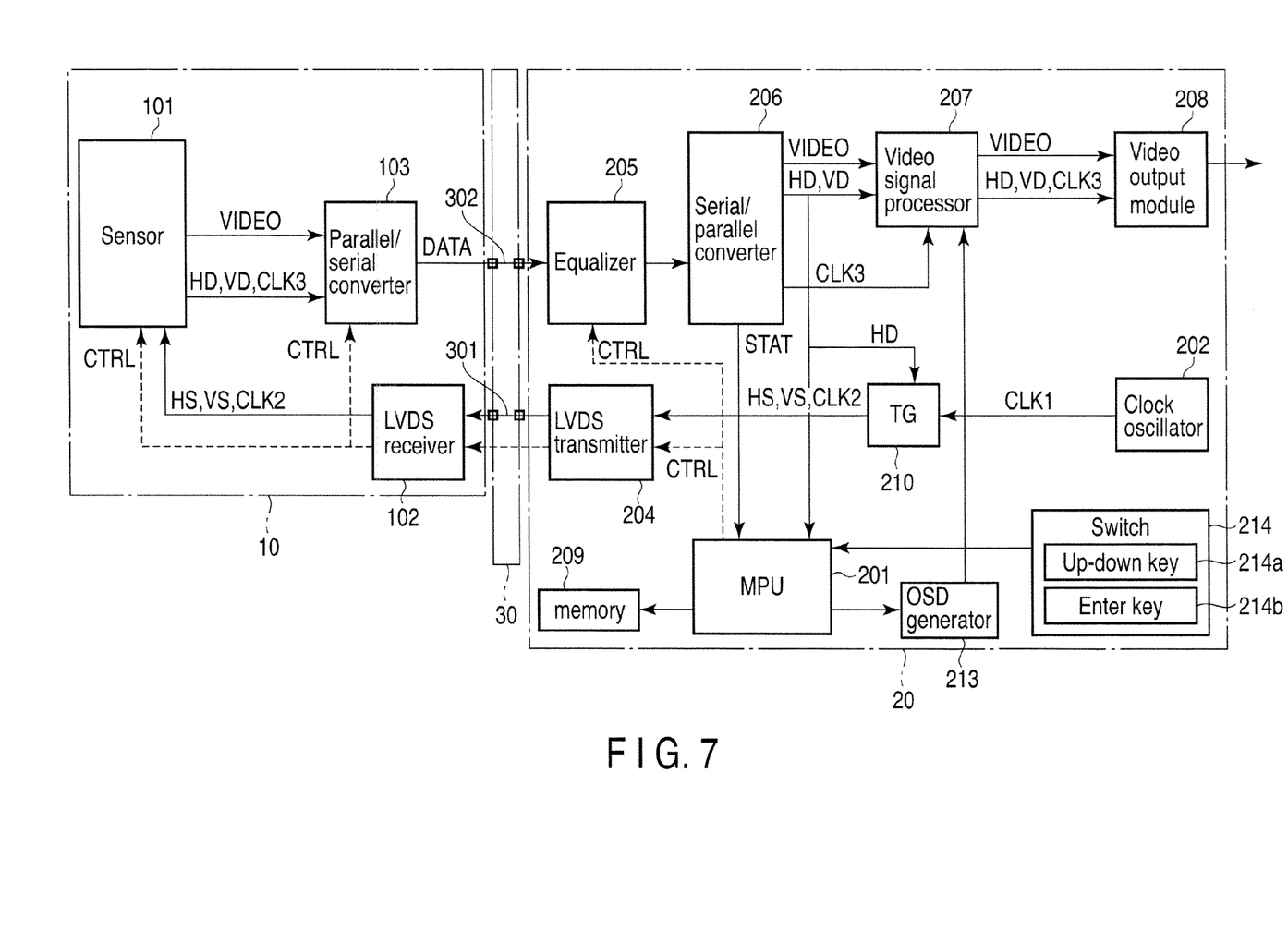
FIG. 7 is an exemplary block configuration diagram for explaining a signal processing system of a head separated camera apparatus according to a third embodiment.

Next, a third embodiment will be described. In the third embodiment, correction is turned on or off according to an OSD menu. FIG. 7 shows a signal processing system of a head separated camera according to the third embodiment. The parts of the third embodiment that correspond to those of the first embodiments are identified by the same reference numerals as those in the first embodiment, and explanations thereof will be omitted. The third embodiment includes a TG 210 in place of the PLD 203 shown in FIG. 1 as the second embodiment.

Figure 8:
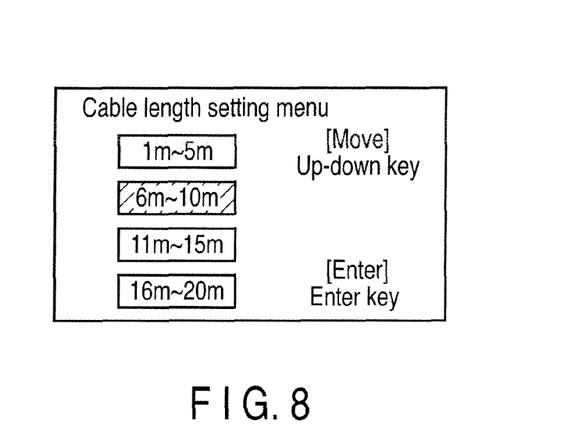
FIG. 8 is an exemplary diagram showing a screen for setting the length of a data signal cable according to the third embodiment.

The CCU 20 comprises an OSD (On Screen Display) generating portion 213 and a switch 214. The OSD generating portion 213 generates OSD screen information, which is superimposed on an image in the screen of a monitor. The OSD generating portion 213 inputs the generated OSD screen information to the video signal processor 207. FIG. 8 is a diagram showing an example of the OSD screen for selecting the length of the data signal cable 302.

The switch 214 comprises an up-down key 214 for moving a cursor up and down and an enter key 214b for fixing a decision. The MPU 201 performs a control for displaying the OSD screen shown in FIG. 8 on the monitor based on a predetermined input. The user selects a column corresponding to the length of the data signal cable 302 connected to the head separated camera on the screen with the up-down key 214a and fixes the selection with the enter key 214b.

The MPU 201 detects the length of the data signal cable 302 based on the input by the enter key 214b. Then, the MPU 201 sets correction conditions in accordance with the length of the data signal cable 302 to the parallel/serial convertor 103 and the equalizer 205 based on the information stored in the memory 209, which is shown in FIG. 4, as well as the first embodiment.

In this embodiment, the user selects the length of the data signal cable 302 by means of the menu of the OSD screen and the switch 214 displayed on the monitor; however, the selection is not limited to this means. In the case of a touch-screen type monitor, the length may be selected only by the OSD screen. If the switch 214 includes a key which allows the user to select the length of the data signal cable 302, the length may be selected only by the switch 214.

Figure 9:
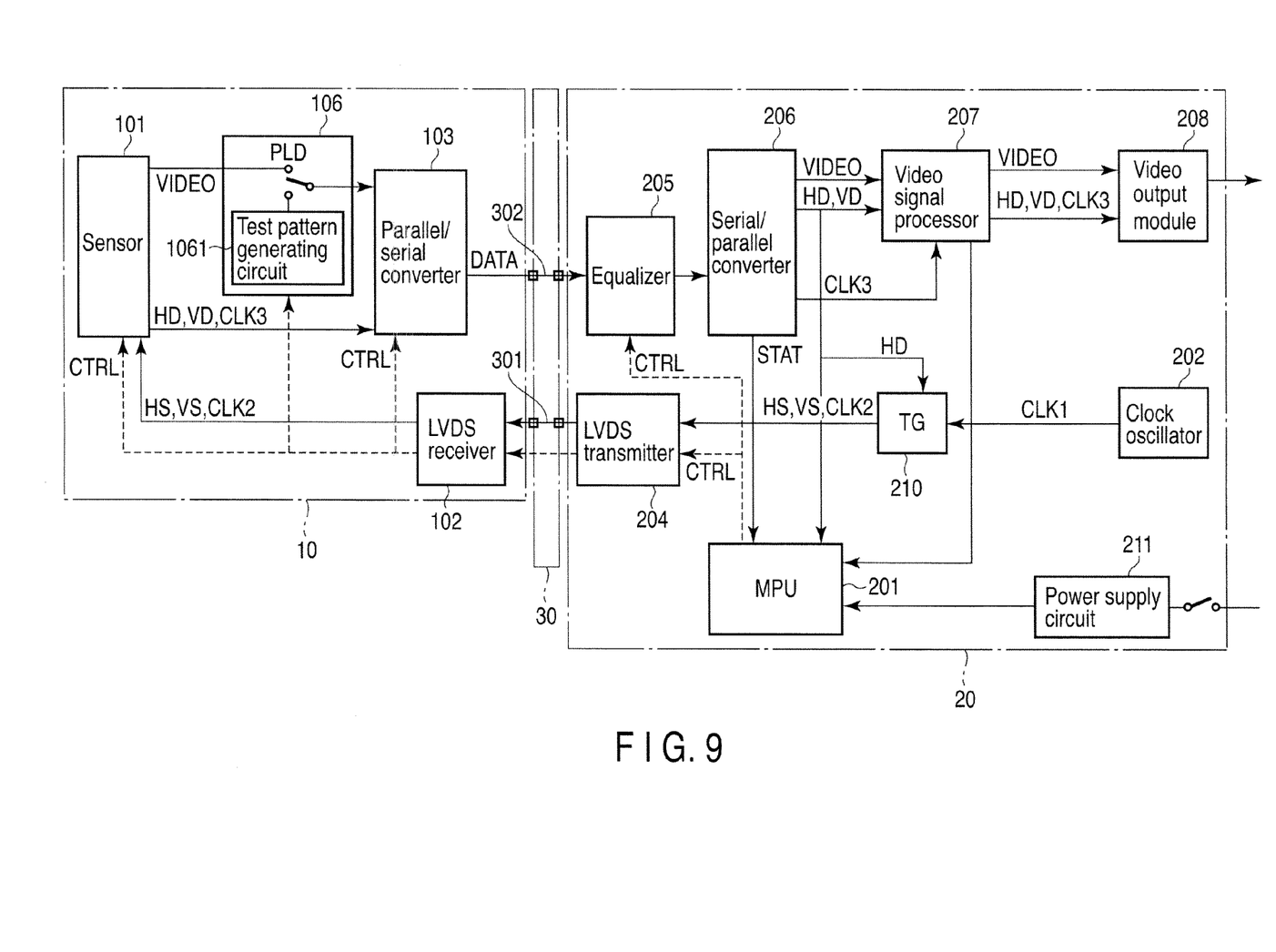
FIG. 9 is an exemplary block configuration diagram for explaining a signal processing system of a head separated camera apparatus according to a fourth embodiment.

A fourth embodiment will now be described. In the fourth embodiment, the camera head 10 transmits a test pattern to the CCU 20, and correction is turned on or off depending on whether there is an error in the test pattern. FIG. 9 shows a signal processing system of a head separated camera according to the fourth embodiment. The parts of the fourth embodiment that correspond to those of the first embodiments are identified by the same reference numerals as those in the first embodiment, and explanations thereof will be omitted. The fourth embodiment includes a TG 210 in place of the PLD 203 shown in FIG. 1 like the second embodiment. Further, as well as in the second embodiment, the CCU 20 comprises the power supply circuit 211. The power supply circuit 211 receives power from an external power supply. The power supply circuit 211 supplies power to the respective parts of the head separated camera.

The camera head 10 comprises a PLD 106 between the sensor 101 and the parallel/serial convertor 103. The PLD 106 comprises a test pattern generating circuit 1061. The PLD 106 switches the circuit to selectively supply data generated in either the sensor 101 or the test pattern generating circuit 1061 to the parallel/serial convertor 103. The test pattern generating circuit 1061 generates predetermined test pattern data. In the fourth embodiment, the test pattern generating circuit 1061 generates data "101010".

When power is supplied to the power supply circuit 211 from the external power supply, the MPU 201 first initializes the respective parts of the camera head 10 and the CCU 20. After the initialization of the respective parts, the MPU 201 switches the circuit of the PLD 106 so as to supply the test pattern data generated by the test pattern generating circuit 1061 to the parallel/serial convertor 103. The parallel/serial convertor 103 transmits the test pattern data to the CCU 20 through the data signal cable 302. The video signal processor 207 supplies the test pattern data to MPU 201.

Figure 10:
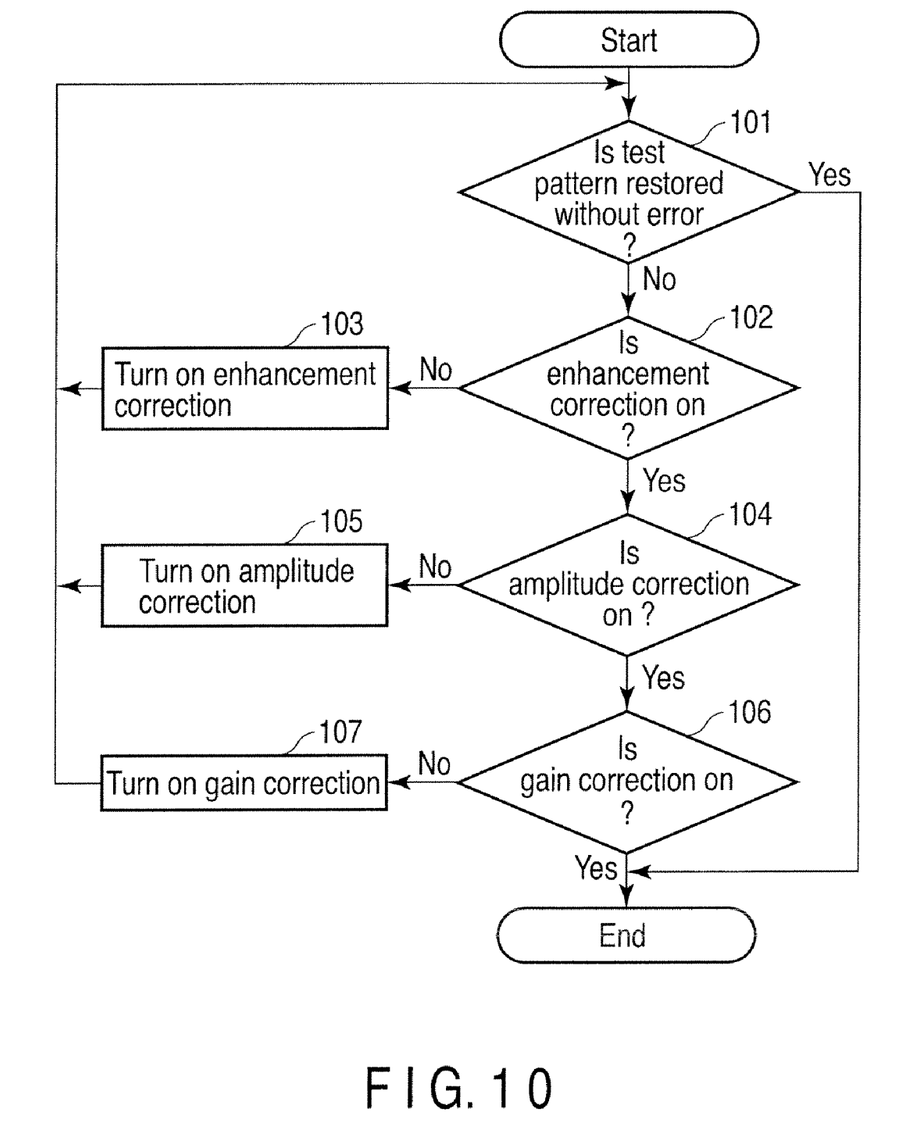
FIG. 10 is an exemplary flowchart showing a process of determining correction to serial data according to the fourth embodiment.

The MPU 201 sets ON/OFF of the enhancement correction and ON/OFF of the amplitude correction by the parallel serial convertor 103, and ON/OFF of the gain correction by the equalizer 205 based on the test pattern data as will be described below. FIG. 10 is a flowchart for explaining correction setting of data transmitted through the data signal cable 302.

First, the MPU 201 determines whether or not the test pattern data generated by the test pattern generating circuit 1061 has been restored without an error (Block 101). The error of the test pattern may be detected by comparing data of the restored test pattern with that of the original test pattern in pixel-by-pixel basis. Differences obtained by the pixel-by-pixel basis comparison are accumulated. If a certain amount of differences is found by the comparison but the amount of the differences is less than a predetermined threshold, it may be determined that there is no error. If the test pattern data has been restored without an error (YES in Block 101), the MPU 201 ends the data correction setting. Then, the MPU 201 switches the circuit of the PLD 106 so as to supply the data generated by the sensor 101 to the parallel/serial convertor 103.

If the test pattern data has not been restored without an error (NO in Block 101), the MPU 201 determines whether the test pattern data transmitted from the parallel/serial convertor 103 to the CCU 20 has been enhancement-corrected or not (Block 102).

If the parallel/serial convertor 103 has not performed enhancement correction (NO in Block 102), the MPU 201 turns on the enhancement correction by the parallel/serial convertor 103 (Block 103). Then, the MPU 201 performs control to transmit the test pattern data to the CPU 20. The MPU 201 returns to Block 101 and determines again whether or not the test pattern data has been restored without an error.

If the the parallel/serial convertor 103 has performed the enhancement correction (YES in Block 102), the MPU 201 determines whether the parallel/serial convertor 103 has performed amplitude correction to the test pattern data in addition to the enhancement correction (Block 104).

If the parallel/serial convertor 103 has not performed the amplitude correction (NO in Block 104), the MPU 201 turns on the amplitude correction in addition to the enhancement correction by the parallel/serial convertor 103 (Block 105). Then, the MPU 201 performs control of transmitting the test pattern data to the CCU 20. The MPU 201 returns to Block 101 and determines again whether or not the test pattern data has been restored without an error.

If the parallel/serial convertor 103 has performed the amplitude correction (YES in Block 103), the MPU 201 determines whether or not the parallel/serial convertor 103 has performed the enhancement correction and the amplitude correction to the test pattern data and further the equalizer 205 has performed gain correction (Block 106).

If the equalizer 205 has not performed the gain correction (NO in Block 106), the MPU 201 turns on the gain correction by the equalizer 205 in addition to the enhancement correction and amplitude correction by the parallel/serial convertor 103 (Block 107). Thereafter, the MPU 201 performs control of transmitting the test pattern data to the CCU 20. The MPU 201 returns to Block 101 and determines again whether or not the test pattern data has been restored without an error.

If the equalizer 205 has performed the gain correction (YES in Block 106), the MPU 201 ends the data correction setting.

In the fourth embodiment, before the parallel/serial convertor 103 transmits serial data including the signal VIDEO to the CCU 20, the MPU 201 sets ON/OFF of the enhancement correction, amplitude correction and gain correction in accordance with the degree of restoration of the test pattern data. Therefore, the waveforms of serial data that the serial/parallel convertor 206 receives from the parallel/serial convertor 103 never have a narrowed eye pattern.

Figure 11:
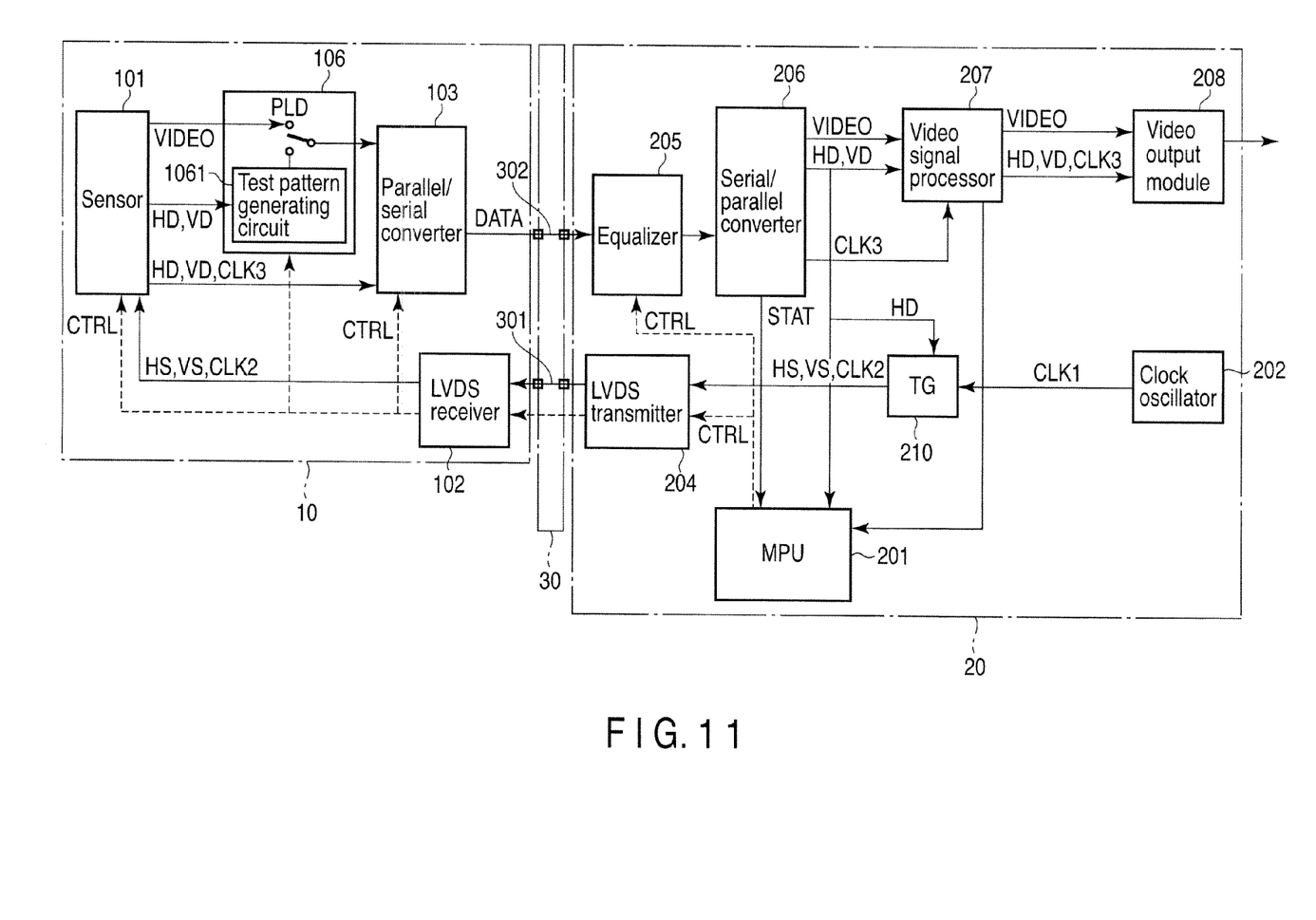
FIG. 11 is an exemplary block configuration diagram for explaining a signal processing system of a head separated camera apparatus according to a fifth embodiment.

Next, a fifth embodiment will be described. In the fifth embodiment, a test pattern is transmitted during a blanking period. FIG. 11 shows a signal processing system of a head separated camera according to the fifth embodiment. The parts of the fifth embodiment that correspond to those of the first embodiments are identified by the same reference numerals as those in the first embodiment, and explanations thereof will be omitted. The fifth embodiment has the same configuration as the fourth embodiment shown in FIG. 9. The sensor 101 supplies the signal HD or VD to the test pattern generating circuit 106.

While the head separated camera is operating, the MPU 201 switches the circuit of the PLD 106 at predetermined timing so as to supply the test pattern data generated by the test pattern generating circuit 106 to the parallel/serial convertor 103. The predetermined timing means every blanking period of the signal HD or VD. The MPU 201 inserts the test pattern data during the blanking period of the signal HD or VD. The test pattern is the same as in the fourth embodiment.

The parallel/serial convertor 103 transmits the serial data including the test pattern data to the CCU 20. The video signal processor 207 supplies the test pattern data to MPU 201. As well as the fourth embodiment, the MPU 201 determines the degree of restoration of the test pattern data and sets ON/OFF of the enhancement correction, amplitude correction and gain correction in accordance with the determination.

According to the fifth embodiment, even when the head separated camera is operating, the correction of data transmitted through the data signal cable 302 can be set.

As described above, according to the first to fifth embodiments, even if the data signal cable 302 is relatively long, the camera head 10 can transmit stable serial signals to the CCU 20. Therefore, the CCU 20 can output stable images to the monitor. The head separated camera will work more effectively if configurations of the first to fifth embodiments are combined appropriately.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A head-separated camera device comprising an imaging unit, a control unit configured to control the imaging unit, and a connection unit configured to connect the imaging unit with the control unit, wherein
the imaging unit comprises
a sensor configured to capture an image, and
a transmitter configured to transmit the image captured by the sensor as a digital video signal, and
the control unit comprises
a video processor configured to perform an imaging process to the digital video signal received from the imaging unit,
a determining module configured to determine whether a waveform of the digital video signal is a waveform that the video processor is processable, and
a setting module configured to set the transmitter to perform enhancement correction to a rise of the digital video signal, if the determining module determines that the waveform of the digital video signal is not the waveform that the video processor is processable.

2. The device of claim 1, wherein if the setting module determines that the waveform of the digital video signal is not the waveform that the video processor is processable after the enhancement correction is performed, the control unit is configured to set the transmitter to perform amplitude correction to the digital video signal in addition to the enhancement correction.

3. The device of claim 2, wherein the control unit comprises a gain correction module configured to perform gain correction to the digital video signal, in addition to the enhancement correction and the amplitude correction to the digital video signal by the transmitter, if the setting module determines that the waveform of the digital video signal is not the waveform that the video processor is processable after the enhancement correction and the amplitude correction are performed.

4. The device of claim 1, wherein the control unit comprises a timing signal generator configured to output a first sync signal for driving to the sensor, and the determining module is configured to determine a length of the connection unit based on a difference in phase between the first sync signal and a second sync signal received from the imaging unit to reproduce the image and determine whether the video processor is processable in accordance with the length of the connection unit.

5. The device of claim 1, wherein:
the control unit comprises a first voltage supply module configured to supply a voltage to the imaging unit;
the imaging unit comprises a second voltage supply module configured to return the voltage supplied from the first voltage supply module to the determining module; and
the determining module is configured to calculate an amount of voltage drop from a difference between the voltage supplied by the first voltage supply module and the voltage returned from the second voltage supply module, determines the length of the connection unit based on the amount of the voltage drop and determine whether the video processor is processable in accordance with the length of the connection unit.

6. The device of claim 1, wherein:
the control unit comprises a selecting module configured to select the length of the connection unit; and
the determining module is configured to determine the length of the connection unit based on the length of the connection unit input by the selecting module and determine whether the video processor is processable in accordance with the length of the connection unit.

7. The device of claim 1, wherein:
the imaging unit comprises a test pattern generator configured to generate a test pattern, which is transmitted from the transmitter to the control unit; and
the determining module is configured to determine that the video processor is processable if the determining module determines that the test pattern includes no error, and determine that the video processor is not processable if the determining module determines that the test pattern includes an error.

8. The device of claim 7, wherein the transmitter is configured to transmit the test pattern to the control unit when the imaging unit and the control unit are powered on.

9. The device of claim 7, wherein the transmitter is configured to transmit the test pattern in a blanking period of the digital video signal to the control unit when the imaging unit and the control unit are operating.

10. The device of claim 3, wherein the control unit comprises a memory configured to store information associating ON/OFF of the enhancement correction, the amplitude correction and the gain correction with the length of the connection unit.

11. A head-separated camera device comprising an imaging unit, a control unit configured to control the imaging unit, and a connection unit configured to connect the imaging unit with the control unit, wherein
the imaging unit comprises
a sensor configured to capture an image, and
a transmitter configured to transmit the image captured by the sensor as a digital video signal, and
the control unit comprises
a determining module configured to determine whether the digital video signal is distinguishable,
a setting module configured to set the transmitter to perform enhancement correction to a rise of the digital video signal, if the determining module determines that the digital video signal is not distinguishable, and
a video processor configured to perform an imaging process to the digital video signal received from the imaging unit.

12. The device of claim 11, wherein the determining module is configured to determine whether the digital video signal is distinguishable based on whether an eye pattern of a waveform of the digital video signal is narrowed.

13. The device of claim 11, wherein if the determining module determines that the digital video signal is not distinguishable after the enhancement correction is performed, the control unit is configured to set the transmitter to perform amplitude correction to the digital video signal in addition to the enhancement correction.

14. The device of claim 13, wherein the control unit comprises a gain correction module configured to perform gain correction to the digital video signal, in addition to the enhancement correction and the amplitude correction to the digital video signal by the transmitter, if the setting module determines that the digital video signal is not distinguishable after the enhancement correction and the amplitude correction are performed.

15. The device of claim 11, wherein the control unit comprises a timing signal generator configured to output a first sync signal for driving to the sensor, and the determining module is configured to determine a length of the connection unit based on a difference in phase between the first sync signal and a second sync signal received from the imaging unit to reproduce the image and determine whether the digital video signal is distinguishable in accordance with the length of the connection unit.

16. The device of claim 11, wherein:
the control unit comprises a first voltage supply module configured to supply a voltage to the imaging unit;
the imaging unit comprises a second voltage supply module configured to return the voltage supplied from the first voltage supply module to the determining module; and
the determining module is configured to calculate an amount of voltage drop from a difference between the voltage supplied by the first voltage supply module and the voltage returned from the second voltage supply module, determines the length of the connection unit based on the amount of the voltage drop and determine whether the digital video signal is distinguishable in accordance with the length of the connection unit.

17. The device of claim 11, wherein:
the control unit comprises a selecting module configured to select the length of the connection unit; and
the determining module is configured to determine the length of the connection unit based on the length of the connection unit input by the selecting module and determine whether the digital video signal is distinguishable in accordance with the length of the connection unit.

18. The device of claim 14, wherein the control unit comprises a memory configured to store information associating ON/OFF of the enhancement correction, the amplitude correction and the gain correction with the length of the connection unit.

19. The device of claim 11, wherein:
the imaging unit comprises a test pattern generator configured to generate a test pattern, which is transmitted from the transmitter to the control unit; and
the determining module is configured to determine that the video signal is distinguishable if the determining module determines that the test pattern includes no error, and determine that the video signal is not distinguishable if the determining module determines that the test pattern includes an error.

20. The device of claim 19, wherein the transmitter is configured to transmit the test pattern to the control unit when the imaging unit and the control unit are powered on.

21. The device of claim 19, wherein the transmitter is configured to transmit the test pattern in a blanking period of the digital video signal to the control unit when the imaging unit and the control unit are operating.

22. A transmitting method for a digital video signal at a head-separated camera device comprising an imaging unit, a control unit configured to control the imaging unit, and a connection unit configured to connect the imaging unit with the control unit, the method comprising:
transmitting the image captured by the imaging unit as a digital video signal; and
determining whether the digital video signal is distinguishable, transmitting a control signal to the imaging unit to perform enhancement correction to a rise of the digital video signal, if the determining module determines that the digital video signal is not distinguishable by the video processor, and performing an imaging process to the digital video signal transmitted from the imaging unit, by the control unit.

* * * * *